United States Patent [19]

McDonald

[11] Patent Number: 4,858,846
[45] Date of Patent: Aug. 22, 1989

[54] WIRING HARNESS

[76] Inventor: Rodney L. McDonald, Box A-5 Kassal Rd., Homer City, Pa. 15748

[21] Appl. No.: 181,172

[22] Filed: Apr. 13, 1988

[51] Int. Cl.$^4$ ............................................. B65H 75/34
[52] U.S. Cl. ................................... 242/85.1; 242/129
[58] Field of Search ............ 242/85.1, 96, 129, 84.25, 242/100.1, 107.1; 191/12.2 R, 12.2 A, 12.4; 24/129 R, 129 B

[56] References Cited

U.S. PATENT DOCUMENTS

| | | | |
|---|---|---|---|
| 200,791 | 4/1965 | Smith | D8/358 |
| 202,118 | 8/1965 | Finneman | D8/358 |
| 229,658 | 12/1973 | Oxel | D7/390 |
| 282,359 | 1/1986 | Schwartz | D14/53 |
| 2,351,379 | 6/1944 | Wehringer | 242/85.1 X |
| 3,273,823 | 9/1966 | Taylor | 242/129 |
| 3,821,496 | 6/1974 | Malone | 191/12.2 R |
| 4,165,053 | 8/1979 | Konig | 242/107.1 |
| 4,416,429 | 11/1983 | Jessamine | 242/100.1 X |
| 4,721,268 | 1/1988 | Lerner et al. | 242/85.1 |

Primary Examiner—David Werner
Attorney, Agent, or Firm—Leon Gilden

[57] ABSTRACT

An audio wiring harness apparatus is set forth to remove slack from existing coaxial type cable utilized in the electrical association of various electronic components. A container is provided with a plurality of telescoping heads positioned therein in an aligned orientation to one another wherein their ends are directed towards "U" shaped openings on either side of the container to orient and secure cable thereabout and direct same through the associated openings. Alternatively, spring biased spools may be utilized positioned between the "U" shaped openings to enable a tensioned withdrawal of unused cable within the container. A friction-fit closure positioned over the container enables ready access interiorly of the container and simultaneously closes the "U" shaped openings to capture cable therewith.

5 Claims, 1 Drawing Sheet

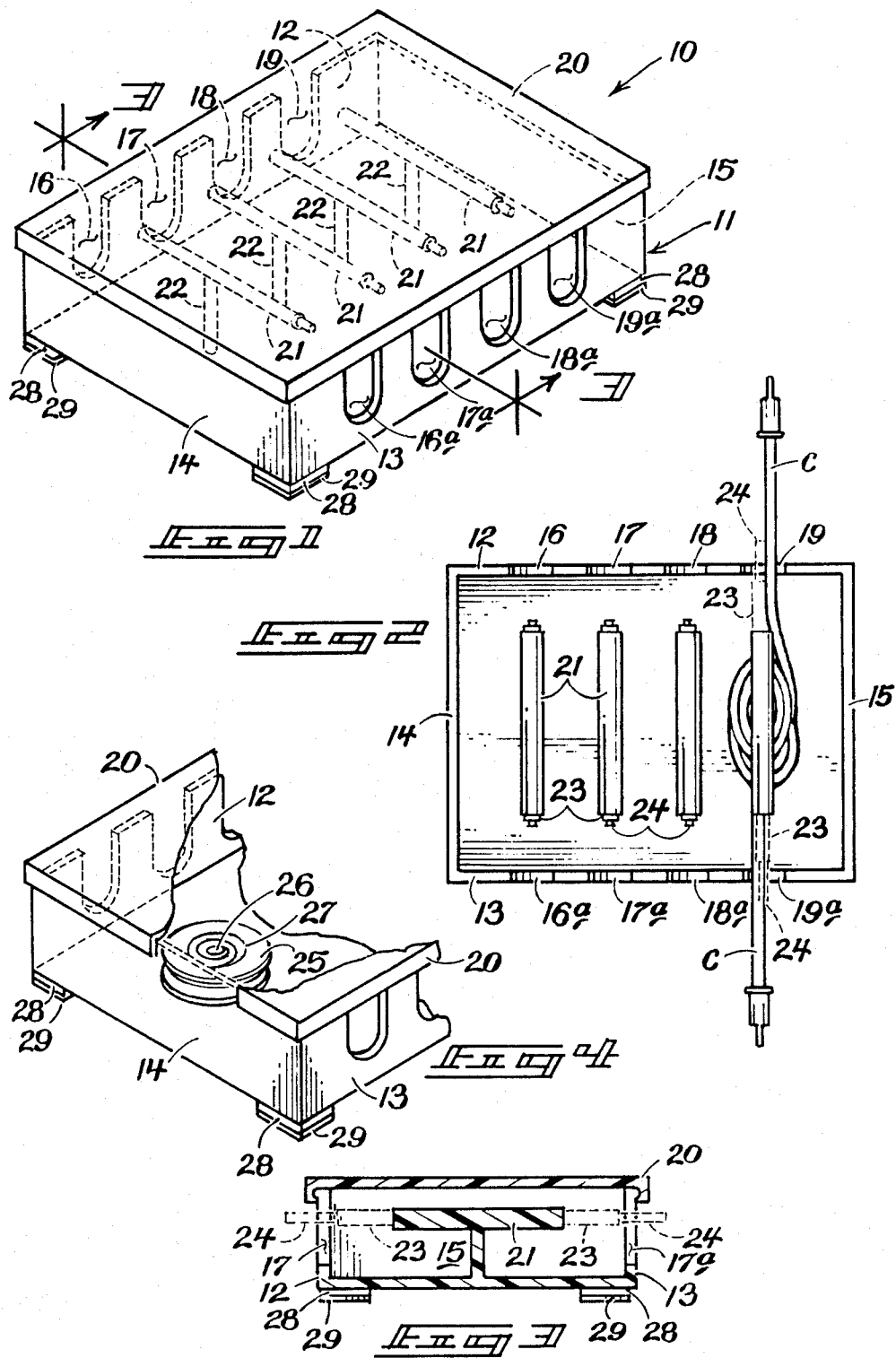

WIRING HARNESS

BACKGROUND OF THE INVENTION

1. Field of the Invention

The field of invention relates to wire holders, and more particularly pertains to a new and improved wiring harness for securement of coaxial type cable therein eliminating slack and disarray in the electrical association of various electronic components.

2. Description of the Prior Art

The use of wiring harness apparatus is well known in the prior art. As can be appreciated, these devices have normally been of expansive construction requiring a substantial amount of space and as such, it is desirable to store such devices in limited spaces. The purpose of such harnesses, as in the instant invention, is to provide a level of order to the extensive wiring generally required between various electronic components, such as video cassette recorders, audio reproduction components, and the like. The disposition of wires between these components is not only an added complexity to the tracing of such wiring, but is occasionally of a potentially dangerous situation as such wiring scattered about may snag an unwary individual causing personal injury. In this connection, there have been several attempts to develop wiring harnesses of various configurations. For example, U.S. Pat. No. Des. 200,791 to Smith, U.S. Pat. No. Des. 202,118 to Finneman, U.S. Pat. No. Des. 229,658 to Oxel, and U.S. Pat. No. Des. 282,359 to Schwartz are illustrative of various configurations that have been utilized to provide a harnessing of wiring for various situations.

U.S. Pat. No. 3,273,823 to Taylor sets forth a support device for utilization of products such as wire enabling the wire to be wound about an upright vertically oriented crossing "U" shaped portion to enable ultimate disposition of such wire, as desired. While of interest relative to a wire support device, the patent is of a structure relatively remote from that of the instant invention.

As such, it may be appreciated that there is a continuing need for a new and improved wiring harness which addresses both the problem of storage, portability, and compact construction and in this respect, the present invention substantially fulfills this need.

SUMMARY OF THE INVENTION

In view of the foregoing disadvantages inherent in the known types of wiring harnesses now present in the prior art, the present invention provides a wiring harness wherein the same may compactly store a plurality of coaxial type cables between various electronic components and may be easily and efficiently utilized, as desired. As such, the general purpose of the present invention, which will be described subsequently in greater detail, is to provide a new and improved wiring harness which has all the advantages of the prior art wiring harnesses and none of the disadvantages.

To attain this, the present invention comprises a container formed with a plurality of aligned "U" shaped apertures along opposed sides thereof with a "T" shaped guide member positioned between respective pairs of apertures. Said guide member is formed of a cylindrical telescoping portion whose axis generally align with the apertures. Alternatively, a spring biased pulley arrangement may be utilized to orient the various wires in alignment between apertures.

My invention resides not in any one of these features per se, but rather in the particular combination of all of them herein disclosed and claimed and it is distinguished from the prior art in this particular combination of all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wiring harness which has all the advantages of the prior art wiring harnesses and none of the disadvantages.

It is another object of the present invention to provide a new and improved wiring harness which may be easily and efficiently manufactured and marketed.

It is a further object of the present invention to provide a new and improved wiring harness which is of a durable and reliable construction.

An even further object of the present invention is to provide a new and improved wiring harness which is susceptible of a low cost of manufacture with regard to both materials and labor, and which accordingly is then susceptible of low prices of sale to the consuming public, thereby making such wiring harnesses economically available to the buying public.

Still yet another object of the present invention is to provide a new and improved wiring harness which provides in the apparatuses and methods of the prior art some of the advantages thereof, while simultaneously overcoming some of the disadvantages normally associated therewith.

Still another object of the present invention is to provide a new and improved wiring harness provided with a plurality of aligned apertures within opposed sides of a container with an interposed telescoping guide member therebetween pairs of aligned apertures to maintain wound coaxial type wire therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention illustrating the various components, their parts, and relationship.

FIG. 2 is a top orthographic view of the instant invention with the associated lid removed to illustrate the organization interiorly of the container.

FIG. 3 is an orthographic view taken along the lines 3—3 of FIG. 1 in the direction indicated by the arrows.

FIG. 4 is an isometric illustration of a modification of the instant invention utilizing spring retractable pulleys positioned between respective aligned apertures for securement of an associated electrical cable.

DESCRIPTION OF THE PREFERRED EMBODIMENT

With reference now to the drawings, and in particular to FIGS. 1 to 4 thereof, a new and improved wiring harness embodying the principles and concepts of the present invention and generally designated by the reference numeral 10 will be described.

More specifically, it will be noted that the wiring harness 10 essentially comprises a container 11 formed with a first side 12, a second side 13, a first end 14, and a second end 15. Disposed in an aligned relationship along the first and second sides 13 are pairs of "U" shaped apertures illustrated as first aperture 16 with companion first aperture 16a. Accordingly, a second aperture is aligned with a second companion aperture 17a, a third aperture 18 is aligned with a third companion aperture 18a, and a fourth aperture 19 is aligned with a fourth aperture 19a, essentially as illustrated in the figures of the drawing.

A friction lid 20 securely engages about an upper terminal perimeter of the container 11 to close off the various apertures along the first and second sides 12 and 13 to enclose and direct an associated power transmission cord "C", as illustrated for example in FIG. 2.

The guide portion of the instant invention includes a cylindrical guide member aligned with each pair of aligned apertures with the axis of the cylindrical members 21 bisecting the respective apertures. The individual cylindrical guide members 21 are supported by an orthogonal support post 20 about which a respective power cord "C" may be wrapped for storage, and as illustrated in FIG. 2, may thereafter be directed through the various pairs of aligned apertures such as 19 and 19a, as illustrated in FIG. 2, for direction to the electrical opponents to be associated.

To insure proper direction of the power cord "C" within the interior of the container 11, the various cylindrical guide members 21 include opposed pairs of telescoping portions comprising an intermediate telescoping member 23 and a terminal telescoping member 24 wherein they are of a length sufficient to enable the terminal telescoping portion 24 directed through each end of the cylindrical guide members 21 to protrude exteriorly of the first and second sides 12 and 13.

A modification of the instant invention, as illustrated in FIG. 4, comprises a rotary spring bias spool rotatable on an axis 26 wherein axis 26 is generally parallel to the first and second sides 12 and 13 and in alignment with the aforenoted pairs of "U" shaped apertures. A helical spring 27 secured to the axis 26 and to the spool 25 insures retraction of an associated power cord to be wrapped therearound.

The container 11 is formed with a plurality of feet 28 at each corner thereof and secured to the floor of the container wherein an adhesive surface 29 is positioned on each foot 28 to enable positioning of the wire harness 10 in any desired orientation without regard to gravity.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wiring harness for the storage of a plurality of individual electrical transmission cables comprising,
    an open container including a floor, a first side, a second side, a first end, and a second end;
    and
    a plurality of apertures formed in said first side in alignment with like plurality of companion apertures formed in a second side,
    and
    a lid means for frictional engagement with said first and second side and said first and second end;
    and
    a plurality of guide means positioned in alignment with opposed pairs of said apertures and companion apertures wherein said guide means are secured to said floor medially between said apertures and companion apertures for windingly accepting said cables thereabout and for directing terminal ends of said cables through each respective aligned aperture and companion aperture, and
    wherein said guide means comprises a cylindrical guide member including an axis aligned with each aperture and companion aperture and orthogonally and integrally secured to a support post wherein said support post is secured to said floor.

2. A wiring harness as set forth in claim 1 wherein each cylindrical guide member includes a plurality of terminal telescoping members and intermediate telescoping members telescoping within each end of said cylindrical guide member wherein the extension of each intermediate telescoping member and each terminal telescoping member outwardly of said cylindrical guide member is of a length greater than that of each end wherein each terminal end of said terminal telescoping member projects beyond and exterior surface of a respective side.

3. A wiring harness as set forth in claim 2 wherein each aperture is formed as a "U" shaped opening in each side and is open at its upper terminal end defined by an upper terminal end of each side whereupon positioning of said lid in respective apertures are enclosed.

4. A wiring harness as set forth in claim 3 wherein a plurality of feet are secured proximate each junction of a respective side and end and each foot has secured thereto an adhesive surface for adhesive securement to a support surface.

5. A wiring harness as set forth in claim 1 wherein each guide means comprises a spring biased rotatable spool rotatably mounted upon an axis, and said axis is orthogonally secured to said floor and aligned between a respective aperture and companion aperture, and a helical spring is secured to said axis and said spool for maintaining said spool in a predetermined orientation.

* * * * *